(12) United States Patent
Damaraju et al.

(10) Patent No.: US 8,356,202 B2
(45) Date of Patent: Jan. 15, 2013

(54) SYSTEM AND METHOD FOR REDUCING POWER CONSUMPTION IN A DEVICE USING REGISTER FILES

(75) Inventors: Satish Damaraju, El dorado hills, CA (US); Scott Siers, Elk Grove, CA (US); Omar Malik, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1328 days.

(21) Appl. No.: 12/057,685

(22) Filed: Mar. 28, 2008

(65) Prior Publication Data

US 2009/0249041 A1    Oct. 1, 2009

(51) Int. Cl.
*G06F 1/04* (2006.01)
*G06F 1/26* (2006.01)
*G11C 7/10* (2006.01)

(52) U.S. Cl. .............. 713/600; 713/322; 365/189.04
(58) Field of Classification Search .......... 713/320, 713/322, 600; 365/189.04
See application file for complete search history.

(56) References Cited

U.S. PATENT DOCUMENTS

| 5,617,047 | A | * | 4/1997 | Henkels et al. | 327/142 |
| 5,784,630 | A | * | 7/1998 | Saito et al. | 712/30 |
| 5,828,623 | A | * | 10/1998 | Dilbeck | 365/230.05 |
| 6,567,337 | B1 | * | 5/2003 | Sprague et al. | 365/233.11 |
| 6,718,429 | B1 | * | 4/2004 | Theis | 711/101 |
| 7,330,952 | B2 | * | 2/2008 | Barth et al. | 711/167 |
| 7,539,879 | B2 | * | 5/2009 | Terechko et al. | 713/300 |
| 2006/0067144 | A1 | * | 3/2006 | Liu | 365/203 |

* cited by examiner

*Primary Examiner* — Chun Cao
(74) *Attorney, Agent, or Firm* — Garrett IP, LLC

(57) ABSTRACT

A device and method for reducing the power consumption of an electronic device using register file with bypass mechanism. The width of a pulse controlling the word write operation may be extended twice as long so that the extended portion substantially overlaps a following word read pulse. The extension of the pulse width of the read operation may enable lowering the Vcc Min value for the electronic device and thus may lower the power consumption of the device.

15 Claims, 4 Drawing Sheets

SYSTEM AND METHOD FOR REDUCING POWER CONSUMPTION IN A DEVICE USING REGISTER FILES

BACKGROUND OF THE INVENTION

Hand held electronic devices, portable electronic devices, wireless communication devices and the like need to operate using a portable energy source, such as a rechargeable battery. Many efforts are made in the design of these devices, their circuitry and their modes of operation in order to lower their power consumption as much as possible without substantially affecting their performance. One of the parameters by which power consumption of such devices may be affected is the control of the supply voltage to the active units in the electronic circuitry. The lower the supply voltage, the lower the consumed power.

For certain needs two different levels of supply voltage to an electronic circuit may be defined. The first is the minimum level of power supply voltage which may still guarantee that the logical levels at the various pins of units in the circuit are retained. This voltage level is sometimes called stand-by $V_{ccMin}$. The other level is the minimum level of power supply voltage at which the associated unit may still operate. This voltage is sometimes called active $V_{ccMin}$. Active $V_{ccMin}$ may further have two different typical values. The first is defined as the lowest voltage at which lowering of the frequency will no longer enable to write to a memory cell in the register file. This value is sometimes defined as DC Write $V_{ccMin}$. The other value of active $V_{ccMin}$ is the lowest voltage value which still allows completion of 'write' operation to a memory cell in register file for a given frequency. This voltage value is sometimes called AC Write $V_{ccMin}$. The actual level of any of these voltage levels may be affected by several factors, comprising the functionality of the unit, the technology of the unit, the scale and density of the unit, the frequency of operation of the unit, the pulse width at given lines and pins, etc.

One type of electronic unit that may be affected by at least the pulse width is the register file, which is, generally speaking, an array of storage registers that may have more than one set of ports for Read/Write operations, thus allowing more than one source/destination of data to cooperate with the register file.

BRIEF DESCRIPTION OF THE DRAWINGS

The subject matter disclosed in this application is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings in which:

Figure 1:
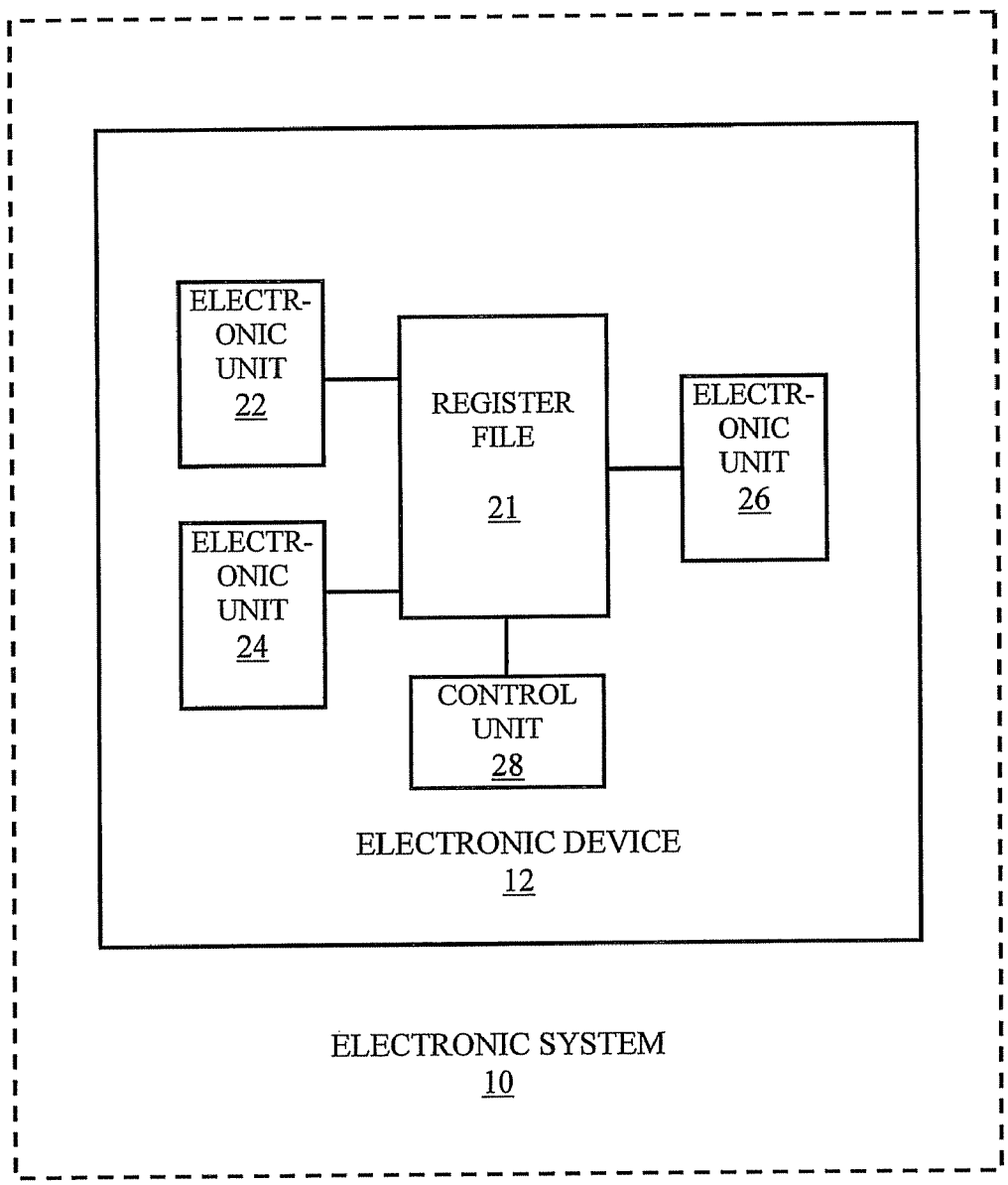
FIG. 1 is a schematic illustration of a system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the subject matter disclosed herein. However, it will be understood by those of ordinary skill in the art that embodiments of the present invention may be practiced without these specific details. In other instances, well-known methods, procedures, components and circuits have not been described in detail so as not to obscure embodiments of the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operation herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROM's), compact disc read-only memories (CD-ROM's), random access memories (RAM's), electrically programmable read-only memories (EPROM's), electrically erasable and programmable read only memories (EEPROM's), FLASH memory, magnetic or optical cards, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of embodiments of the invention as described herein.

Some embodiments of the present invention may be implemented in machine-executable instructions embodied for example on a computer-readable medium such as a memory or disk. These instructions may be used to cause a general-purpose or special-purpose processor that is programmed with the instructions to perform the operations described. Alternatively, the operations may be performed by specific hardware that may contain hardwired logic for performing the operations, or by any combination of programmed computer components and custom hardware components.

A computer program product that may include a machine-readable medium having stored thereon instructions that may be used to program a computer (or other electronic devices) to perform embodiments of the invention. For the purposes of this specification, the terms "machine-readable medium" may include any medium that is capable of storing or encoding a sequence of instructions for execution by the machine and that cause the machine to perform any one of the methodologies of embodiments of the present invention. The term "machine-readable medium may accordingly include, but is not limited to, solid-state memories, optical and magnetic disks, and a carrier wave that encodes a data signal.

Although the scope of the present invention is not limited in this respect, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the internet. It should be understood that embodiments of the present invention may be used in a variety of applications.

Attention is made to FIG. 1, which is a schematic illustration of a system 10 according to embodiments of the present invention. System 10 may be an electronic system such as laptop computers, PDAs, cell phones, play station/gaming consoles, and the like. System 10 may comprise at least one device 12 such as microprocessors, register file chip, etc. Device 12 may comprise two or more units 22, 24 and 26 which may be in active communication with file register 21. Units 22, 24 and 26 may be memory blocks, CPUs and the like. Device 12 may further comprise a control unit 28 which may provide control signals to register file 21. Some or all of units 22, 24 and 26 and control unit 28 and register file 21 may be embodied on integrated circuit (IC), or may be embodied partially on one IC and partially on other IC and/or using discrete logic. Register file 21 may comprise a plurality of registers and possibly plurality of banks of registers. The operation of register file 21 may include for example write to the register operations, read from register operations. Some embodiments may include a bypass of data which is being written to the registers simultaneously directly to the output of the registers regardless of the actual propagation of the 'write' operation in the registers, in order to save the time involved with waiting for the 'write' operation to finish.

Figure 2:
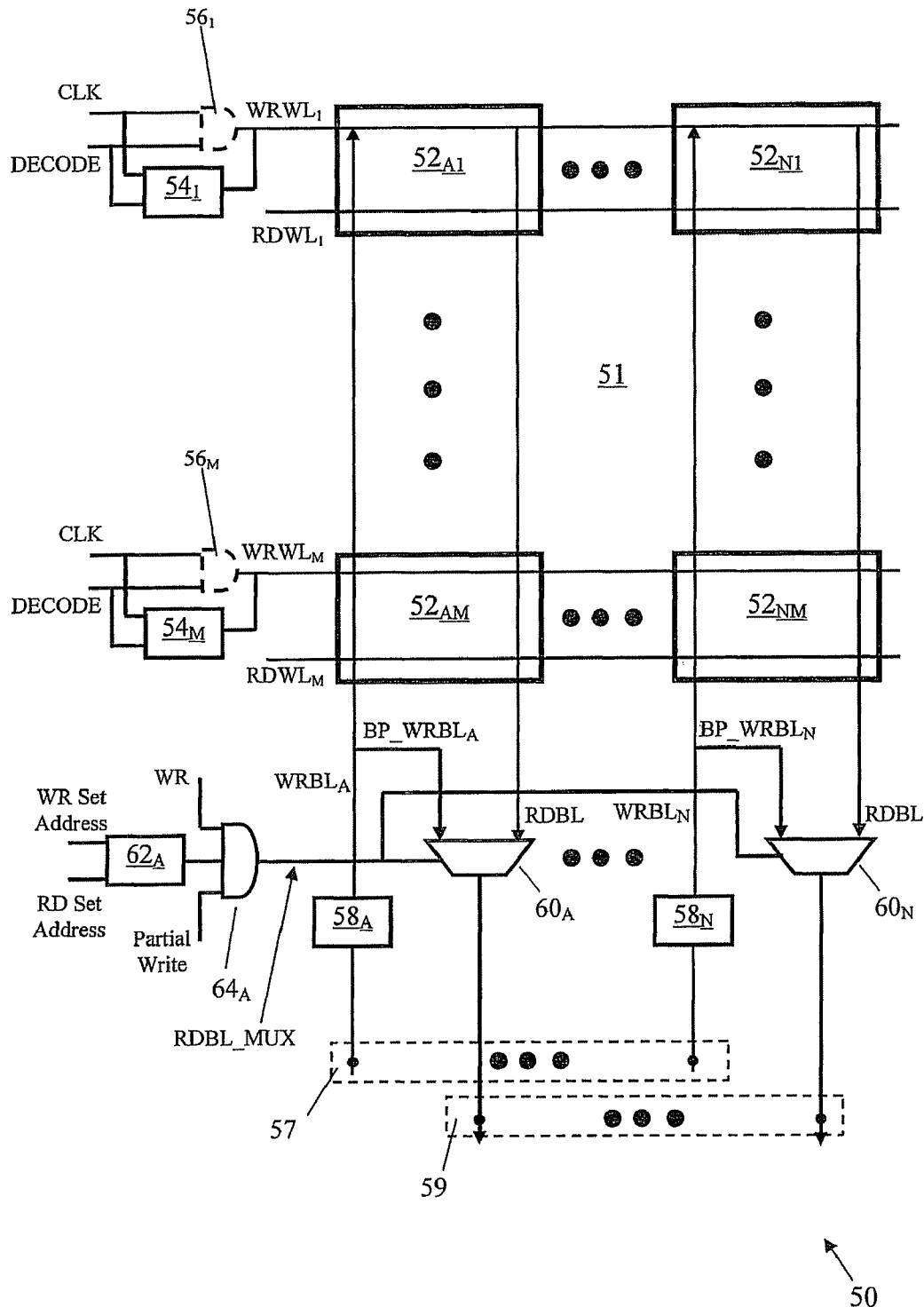
FIG. 2 is a schematic partial illustration of a register file according to embodiments of the present invention.

FIG. 2 is a schematic partial illustration of register file 50 according to embodiments of the present invention. Register file 50 may comprise a plurality of registers 52. Registers 52 may be arranged, for example, in a two-dimension array 51 having, according to the example of FIG. 2, A to N columns and 1 to M rows. Register file array 51 may comprise other number of columns and of rows. Register file array 51 may also be arranged in other manners, such as arranging the registers in banks, which are arranged in an array. Register file array 51 may have a larger or smaller number of registers, banks or bits per register than that depicted in FIG. 2. Those skilled in the art will recognize a number of register file configurations. For example, different storage circuitry or memory cell configurations may be used. Further, a number of configurations may be used to implement connections between cells, between registers, and between banks of registers. Register file 50 may comprise multiplexers 60, one for each bit of a word of a register in register file 50. Register file 50 may also comprise at least one input terminal to receive data to be written to register file 50 and at least one output terminal to receive data from register file 50 and provide it to other units. Register file 50 may comprise latch units 54 and 58, XOR gates 62 and AND gates 64 to control the operation of register file array 51.

Register file 50 may include control circuitry, such as control unit 28 in FIG. 1, which may be used to control for example storing of data in and reading of data from register file 50. Storing of data may be done by providing the write data signal 'write word line' for the j-th row $WRWL_j$, $1<=j<=M$, to select the line j of the registers, a register specific address signal (not shown to not obscure embodiments of the description of the invention) or other identifier of a register on a register address line, and data signals 'write bit line' for the i-th column $WRBL_i$, $A<=i<=N$, to enable writing of the data bits to the selected register. In each register in file register 50 only one bit is shown in the figure; other bits are not shown to not obscure the description of embodiments of the invention. Data signals $WRBL_i$ are received via input terminal 57. It should be apparent for those skilled in the art that other bits of each register may be handled similarly. The reading mechanism may be similar to the writing mechanism described herein. Reading may include selecting a register line j, $1<=j<=M$, by signal $RDWL_j$, selecting a specific register to read from (control circuitry is not shown) and reading the bits of that register using respective RDBL signals. As explained herein with respect to 'write' action, with respect to 'read' action also only one bit line is used to represent all of the bits of a register. Reading of data from a register in register file 50 is made through RDBL line. A write word line WRWL may have signal line sand may operate in association with the operation of a one write bit line.

Register file 50 may include a bypass scheme. A bypass scheme may be used for example to enable shortening of the time between write action and read of the content of the write action from the registers in a register file. In order to avoid the need to wait after a write action until the data in the registers is stable and valid and only then read the associated content of the register, a bypass scheme may allow presenting the data that is being written to the register also at the output terminal 59 of the register file at the same time. Bypass reading may be done through for example the BP_WRBL line and the timing of the data at BP_WRBL line with a data received from register file array 51 on RDBL line so as to present a valid data at the output terminal 59 is done by $Mux_i$ 60, as is explained in more details herein. Since the relevant data to be read is present and valid on lines BP_RDBL and RDBL at different times and possibly at overlapping times a multiplexer (Mux) 60 may be used to select which of the lines in its inputs will be present at its output. Mux 60 may be controlled by control signal RDBL_MUX, which may be driven by control unit 28 of FIG. 1. The outputs of $Mux_i$ are provided via terminal 59.

Figure 3:
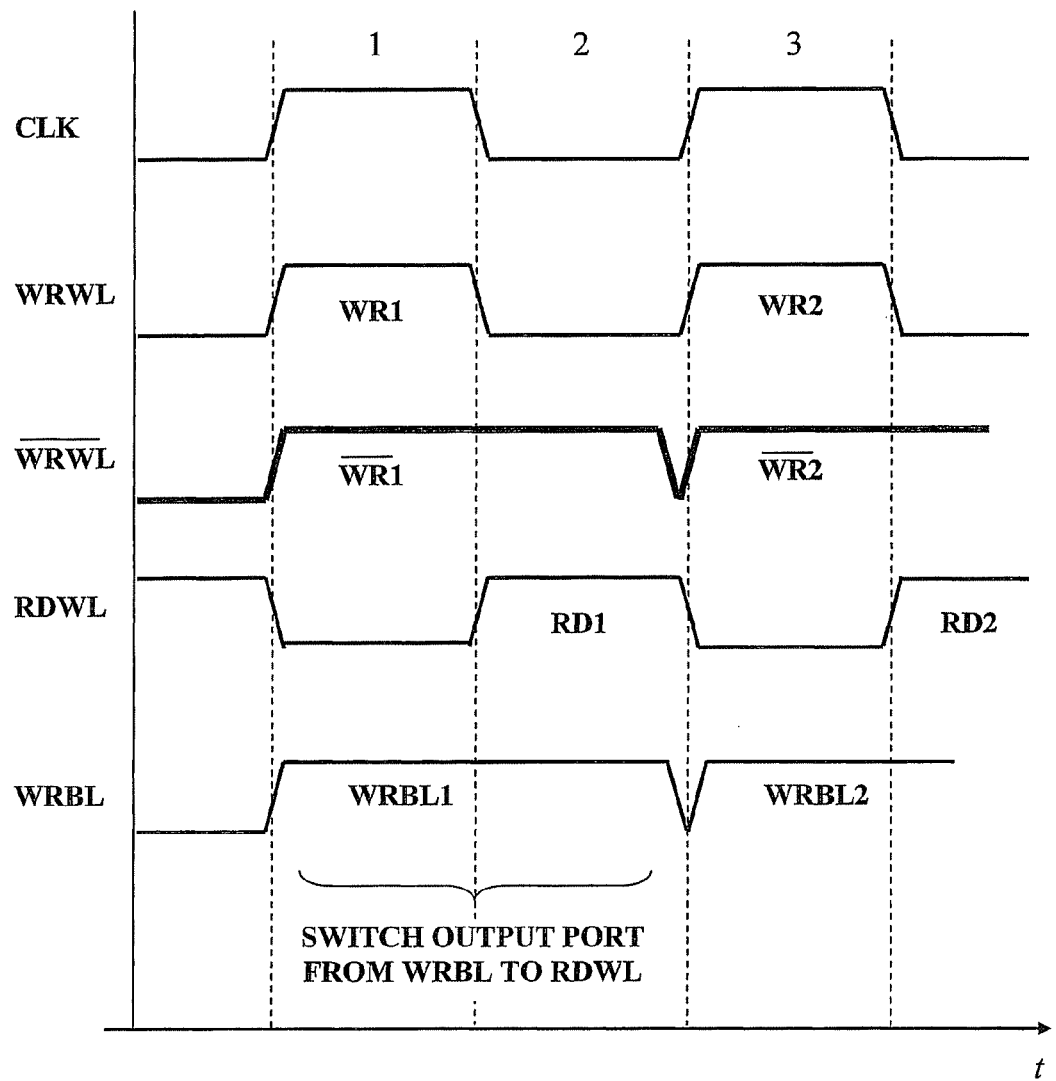
FIG. 3 is a schematic time diagram of signals associated with the operation of a register file according to embodiments of the present invention.

Attention is directed to FIG. 3, which is a schematic time diagram of control signals associated with the operation of a file register. The various signals which are presented in FIG. 1 are logical signals alternating between logic "0" and logic "1" states. It would be apparent that the signals may, however, have different shape, level or nature of control signals which follows the time scheme drawn in FIG. 3 is within the scope of embodiments of the present invention. The signals included in FIG. 1 may be associated with a single memory cell in the file register, with a register, with a bank of registers or with the whole file register, etc. The top-most line in FIG. 3, marked CLK, is the clock pulse signal which determines the propagation of operations in file register 50. The CLK signal has a basic rate which includes two phases, one being the "0" logic level and the other being the "1" logic level. Three consecutive phases of the CLK cycle, phases 1, 2 and 3, are presented. The next line presents the operation that is the logical status of the write word signal controlling the writing of a word to memory and marked WRWL (write word line) in a register file known in the art. The third line presents the operation of a signal of selecting a word (i.e. a row) in register file array 51, marked RDWL (read word line). As may be seen, signals WRWL and RDWL are substantially in antiphase with respect to each other, in order to ensure uninterrupted reading of content that has been written just now. The fourth line presents the operation of write bit to memory signal marked WRBL (write bit line). In order to overcome delays in the overall response time of a memory unit (e.g. a single memory cell, a register, a bank of registers, etc.) which occur due to the settling time of a value (either logic "0" or logic "1") that is being written to the memory unit, a bypass mechanism is used. With such a bypass mechanism the value at the input port of a memory unit may be propagated to the output port of the memory unit concurrently with its presentation at the input port. As seen in FIG. 3 the pulse width of WRBL signal may be as long as almost two clock phases thus presenting the input bit at the input pin of register 52 and at an input pin of Mux 60 substantially from the time when the data is presented to register file 50 until substantially the time of beginning of the next write/read cycle to register 52. As explained above, Mux 60 may be controlled (the signal scheme is not shown) to timely switch the output from WRBL to RDBL thus ensuring early availability of the data written to register file 50 and value retention while the values are already stable and valid in register 52.

A configuration that may limit the lower value of Active VccMin for a register file may include a read-after-write operation in back-to-back phases for example as shown in FIG. 3 which is a schematic time diagram of signals associated with the operation of a register file according to embodiments of the present invention. In one non-limiting embodiment the memory cell write operation (WR1) must finish successfully before read operation (RD1) can start in the next phase as seen in line write word line (WRWL) which corresponds to traditional write scheme and in line read word line (RDWL) which corresponds to read scheme. Accordingly, the pulse width associated with WR1, WR2 operations is limited by the time when the RD1 operation begins. Transistor performance degradation at low voltages coupled with length of transfer and Vt (threshold voltage) mismatches make the write time required longer. On the other hand, frequency targets at low voltages limit the actual available write time. Any scheme that can increase the available write time may help to lower the active VccMin significantly.

Figure 4:
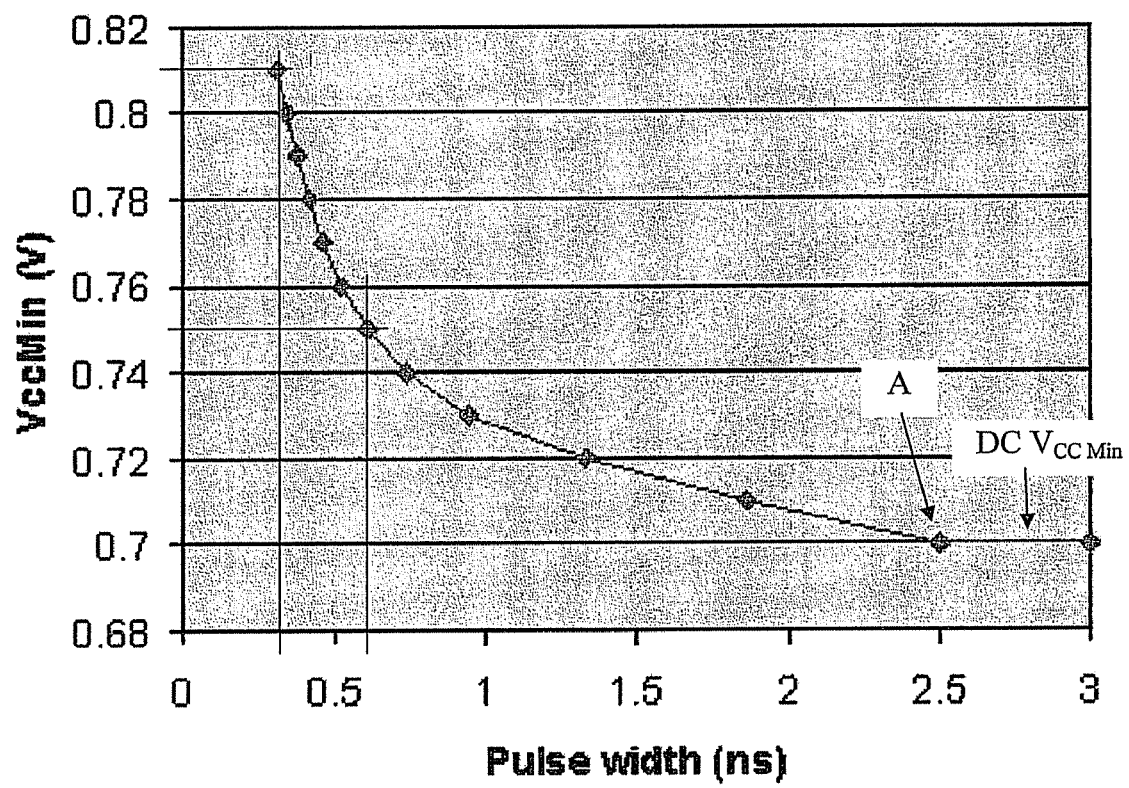
FIG. 4 is a schematic graph depicting the relations between the pulse width and the value of $V_{ccmin}$ in a register file according to embodiments of the present invention.

Attention is directed to FIG. 4, which a schematic graph depicting the relations between the pulse-width of signals controlling operation of register file 50 and the value of $V_{ccMin}$ in a file register, according to embodiments of the present invention. The numbers attached to the graph (e.g., pulse-width values, voltage values, etc.) are illustrative only and may have other values in different examples. As seen in FIG. 4 the value of active $V_{ccMin}$ is an inverted function of the pulse-width of signals controlling the operation of register file 50 for pulse-width values lower than the pulse-width marked A on the graph. The portion of the graph extending from point A and upwards by pulse-width values may correlate to standby $V_{ccMin}$. It should be apparent to one skilled in the art that the graph extending from point A to the left may have several other forms e.g. broken line, curved line, etc. The active $V_{ccMin}$ may be an inverted function of the pulse-width to the left of point A. It will be apparent from FIG. 4 that extending the pulse-width of a control signal of file register 50 may lead to lowering of the value of active $V_{ccMin}$, which in turn may lower the power consumption.

According to embodiments of the present invention a method of extending the pulse-width of the signal controlling the write word operation (WRWL) is presented. Attention is directed to FIG. 2, which depicts logic controlling the operation of various control signals associated with the operation of register file 50. According to embodiments of the present invention minor modifications may be made to a known design of a register file in order to adapt it to embodiments of the present invention. AND gate 56 which controls the operation of WRWL signal (drawn in dashed lines) may be replaced by latch unit 54, to be added to a known design of a register file. Latch unit 54 may be used to hold signal WRWL as long as required according to some embodiments in order to coordinate the timing and duration of WRWL pulse with other operations taking place in said register file, such as the operation of signal WRBL. The modification that may be made when including latch unit 54 may be cancellation of AND gate 56, adding latch unit 54 and wiring of signals CLK and DECODE (used to identify the specific row in register file 50) to latch unit 54. Further, Mux 60 may be added (if not already exists) to enable presenting data at the inputs of register file 50 at once also in the output of register file 50. The signal controlling Mux 60, RDBL_MUX, may be received from an ANDing action in AND gate 64 of the following signals: write signal (WR), Partial Write and the signal that is the output of XOR gate 62 of Write set address signal and Read set address signal. Partial Write signal may be used in cases where partial write cases exist (not specifically discussed in this disclosure). Additionally, register file 50 may comprise latch units 58 to control the timing of WRBL signal in order to hold it valid as long as may be required to enable the proper operation of register file 50 when the duration of WRWL is extended.

The modification of the operation of register file 50 may be achieved as a result of the modification of a known register file as depicted in FIG. 2 and as explained herein.

Signals CLK, RDWL and WRBL in this figure have been described in details above. However, different from the traditional write word line (WRWL) signal scheme, according to some embodiments of the present invention, signal WRWL may be extended substantially twice as long compared with WRWL signal of known register files to last substantially two consecutive phases of clock CLK signal, where the extended portion of the pulse substantially fully overlaps the following RD pulse. The extended WRWL pulse will be denoted herein as $\overline{\text{WRWL}}$. The time scheme of $\overline{\text{WRWL}}$ is shown in the respective line in FIG. 3. The extension of $\overline{\text{WRWL}}$ may be accomplished using the modifications presented and discussed herein. The extension of the pulse width of signal $\overline{\text{WRWL}}$ may be possible for example since the value of the input data to register file 50 is bypassed to the output as long as the bypass signal WRBL is in logical state "1" e.g. during CLK phases 1 and 2. Thus the extension of Write signal WRWL to last substantially as long as WRBL is ON need not change the basic operation of register file 50 yet it may change the operation point of $\overline{\text{WRWL}}$ signal on the graph of FIG. 4. For example if the pulse width of WRWL in a known register file is 0.3 ns then the respective AC Vcc Min is 0.81 Volt. Other time frames and voltage or power levels may be used. The extension of the pulse width of WRWL substantially twice as long, to form $\overline{\text{WRWL}}$ makes its length in one embodiment 0.6 ns and the level of AC Vcc Min may be lowered to approximately 0.75 volts, e.g., approx 60 mV lower than the respective value of AC Vcc Min before the extension. This change in the value of AC Vcc Min is substantive. The associated reduction in consumed energy may be, in some cases, in the order of 8% and the power improvement when a system such as a laptop computer works in a DVD mode (i.e. most of the computational functions are inactive) may be in the order of 18% Other time frames and voltage or power levels may be used.

Although the scope of the present invention is not limited in this respect, the wireless communications technologies may include radio frequency (RF) and infrared. Non-limiting examples of RF wireless standards are protocols, such as, for example, Bluetooth, IEEE-Std 802.11a, IEEE-Std 802.11b, 1999 edition, IEEE-Std 802.11g and HomeRF. Non-limiting examples of infrared light signals are protocols, such as, for example, InfraRed Data Association (IrDA) standard.

While embodiments of the invention has been described with respect to a limited number of embodiments, it will be appreciated that many variations, modifications and other applications of the invention may be made. Embodiments of the present invention may include other apparatuses for performing the operations herein. The appended claims are intended to cover all such modifications and changes.

What is claimed is:

1. A device comprising:
a register file array;
at least one input terminal to provide received data for writing to said register file array via at least one write bit line, the write bit line including at least signal lines, the writing of received data performed in association with a write word signal carried on a write word line having signal lines, and at least one output terminal to receive data from at least said register file array via at least one read bit line; and
a control unit to control the operation of said register file array and said input and output terminals, said control unit to provide:
a clock signal to control the propagation of operations in said register file, said clock signal operating in a basic rate having two phases; and
the write word signal to enable writing to a row of registers comprising at least one register;
wherein the write word signal is extended to last substantially two consecutive phases of said clock in a read-after-write operation.

2. The device of claim 1 further comprising a bypass mechanism to allow presenting input data being written to said register file simultaneously at said output terminal, regardless of the propagation of the writing.

3. The device of claim 2, comprising latch units on the at least signal lines of write bit line and signal lines of the write word line to enable time-coordination of write bit signals with said extended write word signal.

4. The device of claim 1 wherein said register file array comprises a two-dimensional array.

5. The device of claim 1, comprising a multiplexer to receive an output data bit from a register in said register file array at a first input and an input data bit to said register in a second input and to provide an output data bit to said output terminal.

6. The device of claim 5, comprising a control signal to control said multiplexer, said control signal is a logic result of an AND function of a write control signal and a logic XOR of write set address signal and read set address signal.

7. The device of claim 2 wherein said bypass mechanism comprises a multiplexer to provide at its output one of an output data bit signal from a register in said register file array and an input data bit signal to be written to said register.

8. The device of claim 1 wherein the extended write word signal is to lower the value of active VccMin of said device.

9. The device of claim 8 wherein said lowering of the value of active VccMin is to lower power consumption of said device.

10. A device comprising:
a register file array;
an input terminal, said input terminal to provide received data to said register file array;
an output terminal, said output terminal to receive data from at least said register file array via at least one read bit line;
at least one write bit line having signal lines;
at least one write word line having signal lines, said write word line to operate in association with operation of said at least one write bit line; and
a control unit to control the operation of said register file array and said input terminals and said output terminals, said control unit to provide:
a clock signal to control the propagation of operations in said register file, said clock signal operating in a basic rate having two phases; and
a write word signal to enable writing to a row of registers comprising at least one register;
wherein the write word signal is extended to last substantially two subsequent consecutive phases of said clock in a read-after-write operation.

11. The device of claim 10 comprising a bypass mechanism to present input data being written to said register file at said output terminal simultaneously to said write word signal, regardless of the propagation of the write-operation.

12. The device of claim 11, comprising:
a plurality of latch units disposed on the signal lines of write bit line and on the signal lines of word write line to enable time-coordination of write bit line and write word line signals with said extended write word signal.

13. The device of claim 12 wherein said register file array comprises a two-dimensional array.

14. The device of claim 12, comprising:
a multiplexer comprising inputs, the multiplexer to receive an output data bit from a register in said register file array at a first input and to receive an input data bit to said register in a second input and to provide an output data bit to select which of the lines in the multiplexer inputs are presented at a multiplexer output.

15. The device of claim 14, comprising a control signal to control said multiplexer, said control signal being a logic result of an AND function of a write control signal and a logic XOR of write set address signal and read set address signal.

* * * * *